Fig. 1

DENNY D. PIDHAYNY
EMORY LAKATOS
EVERETT M. GOODELL
INVENTORS

Jan. 15, 1963     D. D. PIDHAYNY ETAL     3,074,061
GUIDANCE SYSTEM Filed April 2, 1958     3 Sheets-Sheet 3

DENNY D. PIDHAYNY
EMORY LAKATOS
EVERETT M. GOODELL
       INVENTORS

BY

ATTORNEY

United States Patent Office 3,074,061
Patented Jan. 15, 1963

3,074,061
GUIDANCE SYSTEM
Denny D. Pidhayny, Los Angeles, Emory Lakatos, Santa Monica, and Everett M. Goodell, Palos Verdes Estates, Calif., assignors, by mesne assignments, to Thompson Ramo Wooldridge Inc., Cleveland, Ohio, a corporation of Ohio
Filed Apr. 2, 1958, Ser. No. 726,094
8 Claims. (Cl. 343—5)

The present invention relates in general to improvements in guidance systems for a vehicle such as an aircraft, and more particularly to improved apparatus that may be used in such a system for detecting the presence of and warning against obstacles that may endanger the vehicle during its guidance along a path of travel.

The present invention is described by way of example in connection with its use in aircraft collision protection. However, it should be mentioned at the outset that the present invention has general application, that is to say, the underlying principles of the present invention may be used to protect any type of craft which may from time to time be threatened by immediate or ultimate collision with other craft or obstacles. Thus, for example, while an embodiment of the invention may be designed to operate at radio frequencies for use in an aircraft, another embodiment of the subject invention may be designed to operate at ultrasonic frequencies for use in a submarine.

As air traffic continues to increase, the problem of collision avoidance becomes ever more acute. Daily there are reports of collisions and near misses between aircraft as landing fields and air lanes become more and more congested. With the advent of jet airliners, the already dangerous situation has become worse, since the speeds of these aircraft are such that there is even less time for a pilot to detect the presence of a collision threat and take evasive action.

A practical aircraft collision warning system should comprise equipment capable of being borne by the aircraft to be protected, and should be operationally independent of equipment located on the ground or carried by other aircraft. Such a system should provide world-wide protection against terrain and aircraft obstacles and should possess the ability to distinguish between collision and non-collision courses in sufficient time to enable the aircraft, bearing the equipment, to avoid threatened collisions. Also, the system should be able to process information relating to contemporaneous collision threats which may be of different types and provide data or indicia aiding in the execution of proper evasive action. The apparatus disclosed herein can be adapted to meet the foregoing requirements, for the great majority of situations encountered by aircraft, when embodied in a collision warning system such as, for example, the system disclosed in copending U.S. patent application, Serial No. 587,768, filed May 28, 1956, and now Patent Number 2,991,463, issued July 4, 1961, entitled "Collision Indication System" by Emory Lakatos et al., and assigned to the same assignee as the present invention.

One object of the present invention is, therefore, to provide a unitary apparatus for a collision indication system that possesses the ability to develop information as to different types of contemporaneously occurring collision threats.

Another object of the present invention is to provide a unitary system of collision indication that will protect against the presence of dangerous objects bearing various directional relationships to a craft and provide collision avoidance information regarding these objects.

It is an additional object of the present invention to provide apparatus of the type referred to that will detect the presence of objects at close range regardless of their direction relative to the craft to be protected, and at the same time detect the presence of objects at a greater range in a direction where there is a greater likelihood of the presence of threatening objects.

Other objects and advantages will appear as the description of the invention proceeds.

The present invention, in one of its more general forms, provides means establishing at least two distinct types of sensing regions for providing information relative to the presence of objects in the regions. The first of the sensing regions extends outwardly from the craft bearing the apparatus along lines generally concurrent with its path of travel, and the second of the regions extends outwardly from the craft along lines generally transverse to its path of travel. In the embodiment described by way of example, the first sensing region is so defined as to effectively form a first pattern of response extending for an appreciable distance forwardly of the craft and the second sensing region is so defined as to form a second pattern of response extending for a short distance in a generally spherical pattern around the craft. The first and second sensing regions are established by separate antenna systems with the systems being energized by a single signal source. The antenna system associated with the sensing region having the greater range is coupled to receive a greater portion of signal energy from the signal source than the system associated with the lesser range. The same antenna systems are used to receive reflected radiation indicative of the presence of objects. Range gating circuitry is used to determine the distance of a detected object, with the detection of a distant object being identified with the forwardly responsive antenna system and the detection of a close object with the spherically or omnidirectionally responsive antenna system.

In order to develop information as to the evasive maneuver required to avoid a collision, the volume of space observed by a system according to one embodiment of the invention is divided into three categories, each category being used to warn of a different type of collision threat. Specifically, an outer or far-range zone is used to guard against large terrain obstacles, such as mountains, an intermediate zone is used to warn of aircraft that may be traveling on a collision course with the craft to be protected, and an inner or near-range zone is used to guard against objects that have somehow moved dangerously close, as where another aircraft is thrust dangerously close to the craft to be protected by sudden gusts of wind or air pockets. The far-range zone, associated with the forwardly directed radiation pattern, is distance and direction sensitive. The intermediate zone, also associated with the forwardly directed radiation pattern, is distance, direction, velocity, and acceleration sensitive. The near-range zone, associated primarily with the omni-directional radiation pattern, is also only distance and direction sensitive.

In the one embodiment the antenna systems used to radiate energy from the single energy source are also used to receive radiation reflected from objects, and to provide information as to the direction of approach of a threatening object relative to the protected craft. The antenna systems of the two sensing regions are each divided into at least two parts with each antenna system part responsive to only a portion of a sensing region. By this means the direction of the detected object may be ascertained. Thus, for example, a right half of the forward, far-range sensing region may be associated with one antenna of the forward antenna system, and the left half of the forward sensing region associated with a second antenna of the forward antenna system. Similarly, a lower hemisphere of the spherical sensing region may be associated with one antenna of the spherical antenna system and an upper hemisphere of the spherical sensing region associated with a second antenna of the spherical antenna system. The signals received from the first antenna in each system are combined and passed through one receiver channel and the signals received from the second antenna in each system are combined and passed through another receiver channel. For example, the signals from the right and down antennas may be combined and processed in one receiver channel and the signals from the left and up antennas combined and processed in the other receiver channel. Thus only two receiver channels are needed to handle the signals representative of four sensing regions.

In the accompanying three sheets of drawings, wherein like parts are indicated by like reference characters.

*In General*

In the embodiment described by way of example a novel radar transmitter and receiver arrangement is used in a collision threat sensing system to detect the presence of and warn against various types of obstacles that may endanger an aircraft bearing the system. By means of suitably mounted and fed antenna arrays, two distinct, electromagnetic fields are recurrently established about the aircraft, one field being propagated forward of the aircraft, and covering predetermined azimuthal and elevational angles, and the other field being propagated in directions generally transverse of the aircraft to thereby form a substantially omnidirectional or spherical field with the aircraft at the center.

As indicated above, the volume of space observed by the system shown by way of example is divided into three regions: (a) a far-range region, herein referred to as a far range guard ring, for detecting the presence of large terrain obstacles falling within a specified range of rather appreciable distances, say from 10,000 to 12,500 feet from the aircraft; (b) an intermediate region, herein referred to as being made up of a number of collision detection zones, each having a different distance range, for detecting the presence of objects that may be on a collison course with the aircraft to be protected, the collision detection zones extending for a specified distance range of say 1,750 to 10,000 feet from the aircraft; and (c) a near range region, hereinafter referred to as a near range guard ring, for detecting the presence of objects within a specified range of short distances, such as distances of less than about 500 feet from the aircraft.

With respect to the far range guard ring, signals reflected from a terrain obstacle appearing in a prescribed frontal portion of this guard ring are purposely received at two different antenna system portions on the aircraft bearing the system. The phase difference between the signals as detected at these two antenna system portions then becomes a measure of the direction of the obstacle relative to the system. The two out-of-phase signals are then applied to a far range guard channel incorporated in the embodiment of the present invention, which channel then provides directional information, based on the phase angle between the signals, for avoiding the obstacle. Range gating techniques are employed to restrict the sensitivity of the far range guard ring channel to the specified range given at (a) above.

In connection with the near range guard ring, signals returned from an object in this region are received by one of two antennas, the antennas being designed to receive return or echo signals from, respectively, close objects above and below the protected aircraft. Echo signals received from the two antennas are then combined and range gated to make this guard ring responsive only to objects within a prescribed close distance from the aircraft. The direction of a detected object relative to the aircraft is determined by producing, in response to the detection of an object in the near range guard ring, a disabling or "cutoff" signal which is thereafter used to cut-out one of the two antennas or channels associated therewith. If signals continue to be passed to the guard channel, the echo signals must therefore be coming from an object in the direction covered by the antenna that was not cut out. Conversely, if no signals are thereafter passed to the guard channel, the echo signals must necessarily be originating in the direction guarded by the antenna whose intercepted signals have been cut out.

As to the intermediate or collision detection zones of the radiated electromagnetic field, signals returned to the aircraft bearing the system, from other aircraft traveling in these detection zones, have characteristics that may be used to determine whether or not such other aircraft are on a collision course with respect to the protected aircraft. Such characteristics relate to the velocity, distance, rate of change of velocity, and direction of such aircraft relative to the protected aircraft. One such characteristic, namely, Doppler frequency shift, is proportional to the closing velocity between the system and the detected aircraft, closing velocity being defined as the relative velocity between the protected aircraft and the threatening aircraft measured along a straight line connecting the two. The embodiment of the present invention described by way of example includes a collision channel which provides a signal at the Doppler shift frequency, thereby providing the desired closing velocity information. The distance of the detected aircraft collision threat is determined by range gating. If the closing velocity and distance of the collision threat fall within predetermined distance and velocity combinations which together would cause the threat to arrive at the location of the protected aircraft within a given time interval, and if the rate of change of velocity is zero or close to zero, an indication is provided of the danger and of the evasive maneuver required to avoid the danger. The direction of approach of the collision threat may be determined by either of the two direction detection arrangements described.

*The Collision Sensing System*

Figure 1:
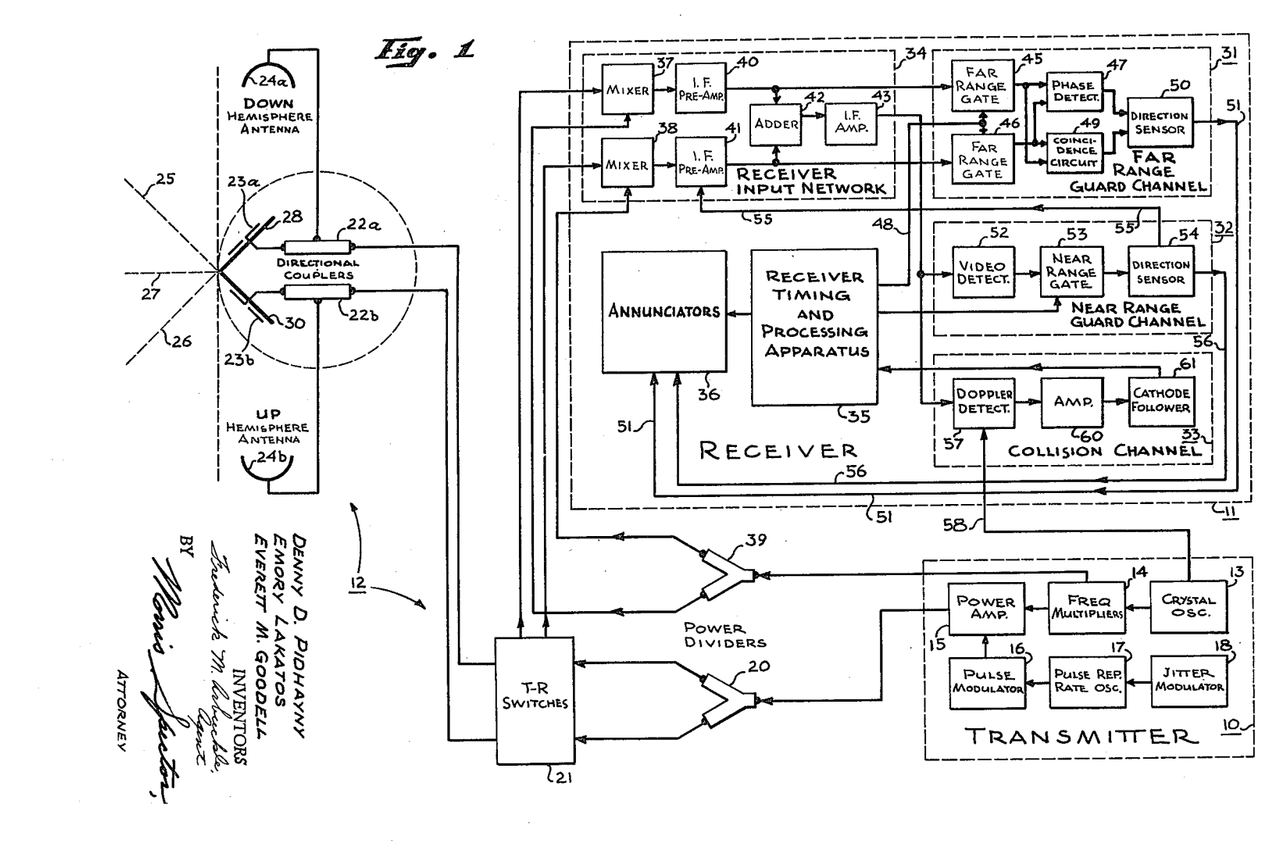
FIGURE 1 is a block diagram of an embodiment of the invention.

Referring now to the drawings, a collision sensing system of the type referred to is broadly shown in FIGURE 1, the transmitter, receiver and antenna portions of the system which embody the present invention being shown in greater detail. The transmitter as a whole is designated 10, the entire system receiver is similarly designated 11, and the antenna network, which performs the dual function of radiating the signals generated by the transmitter and relaying return or echo signals to the receiver, is generally designated 12.

The transmitter 10 includes a crystal oscillator 13 which generates a stable signal at a basic reference frequency. In the embodiment of this invention shown by way of example the frequency of the oscillator signal is 60 megacycles. The oscillator 13 has two output terminals, the first of which is connected to a frequency multiplier circuit 14 which increases the frequency of the oscillator signal to some predetermined higher value. In the present case the oscillator signal is multiplied upwardly a number of times from 60 megacycles to a final 2940 megacycle signal. The second of the two oscillator output terminals is connected to circuitry within the receiver 11, which connection will be described in greater detail later.

The frequency multiplier circuit 14 has two output terminals, one being connected to one of two input terminals of a power amplifier 15, which also performs as a modulator, and the other being connected to an element in antenna network 12. This latter connection will also be presented in greater detail later. The second input terminal of the power amplifier 15 is connected to a pulse modulator circuit 16 that generates a train of pulses used to modulate the 2940 megacycle continuous wave signal applied to the power amplifier 15 by the frequency multiplier 14.

The pulse repetition rate of the pulse train is determined by a pulse repetition rate oscillator 17 connected to the pulse modulator 16. In the embodiment being described the pulse repetition rate is derived from a 40 kilocycle signal generated by the pulse repetition rate oscillator 17. Consequently, the basic repetition rate is 40 kilocycles. However, the pulse repetition rate is varied in a prescribed manner from 40 kilocycles to guard against interference from other signals radiated at substantially the same carrier frequency and pulse repetition rate, this pulse rate variation being realized by a jitter modulator circuit 18 connected to the oscillator 17.

The output end of the power amplifier 15 is also the transmitting end of transmitter 10. Accordingly, whatever signals are produced by the power amplifier 15 are applied to the antenna network 12 for radiation into space.

Considering the component circuits of the transmitter 10 in greater detail, the crystal oscillator 13 may be an electronically coupled crystal oscillator of the type that is well known in the electronic arts, the crystal being preferably contained in a crystal oven to minimize the effects of temperature change, which change may cause undesirable deviations from the frequency at which the oscillator is designed to operate, 60 megacycles in the present case.

The frequency multiplier circuit 14 includes several tandemly connected doubler and tripler stages that successively multiply the frequency of the oscillator signal until a final frequency is obtained that is 48 times that of the original 60 megacycle signal, namely, 2880 megacycles. The signal at this 2880 megacycle frequency is used in the receiver 11 to provide an intermediate frequency signal, as will be explained below. The frequency multiplier circuit 14 also preferably includes a mixer circuit for the purpose of producing a 2940 megacycle signal by heterodyning the 2880 megacycle signal out of the last multiplier stage against the 60 megacycle signal generated by the oscillator 13. Thus the 2940 megacycle carrier frequency is produced. Since conventional doubler, tripler and mixer circuits may be used in the multiplier circuit 14, no further description of them is deemed necessary.

The power amplifier 15, basically, may be a four cavity klystron tube which, when actuated, supplies the required power to the antenna system 12. Various types of klystrons that may be utilized herein are shown and described throughout Volume 7 of the MIT Radiation Laboratory Series, entitled "Klystrons and Microwave Trials," by Donald R. Hamilton, Julian K. Knipp and J. B. Horner Kuper, published in 1948 by the McGraw-Hill Book Company, Inc., New York.

The jitter modulator 18 basically comprises two circuits, one a sawtooth generator circuit that, as the name implies, produces sawtooth signals, and the other a circuit that produces a signal whose frequency varies with the voltage of the sawtooth signal produced by the sawtooth generator. A reactance tube modulator is customarily used for the latter circuit and is preferred herein, the reactance tube modulator operating to vary the inductance of a frequency-determining tank circuit of an oscillator, thereby producing the desired frequency-modulated signal.

The pulse repetition rate oscillator 17 generally comprises a standard type of audio oscillator adjusted to provide a 40 kilocycle signal, the signal being produced at 40 kilocycles by means of a tank circuit tuned to that frequency. The reactance tube modulator heretofore mentioned is customarily connected in parallel with the tank circuit and continuously tunes the tank circuit over a predetermined, usually narrow, range of frequencies by varying the value of inductance in the tank circuit in accordance with the voltage amplitude of the sawtooth signal. The pulse repetition rate oscillator 17 may also include a 40 kilocycle magnetic chopper amplifier that takes the sinusoidal output of the audio oscillator and produces a square-wave signal therefrom.

The pulse modulator 16 preferably includes a lumped-constant transmission line type of pulse-forming network, a full discussion of which is presented on pages 175 through 224 of Volume 6 of the aforementioned MIT Radiation Laboratory Series, entitled "Pulse Generators," by G. N. Glascoe and J. B. Lebacqz, published in 1948 by the McGraw-Hill Book Company, Inc. The pulse modulator 16 serves the purpose of converting the above-mentioned square-wave signal from the oscillator 17 into a train of unidirectional rectangular pulses of proper duration and energy content, the pulse train being applied to the power amplifier 15 to recurrently activate it.

The antenna network 12 radiates into space the pulsed energy generated by the transmitter 10 and includes a transmitter power divider 20, one or more T-R (transmit-receive) switches 21 and a pair of directional couplers 22a and 22b connected in series between the T-R switches and two sets of antennas, the first set comprising a pair of forwardly directed antennas 23a and 23b, and the second set comprising a pair of hemispherically directed antennas 24a and 24b with the antennas of the second set together forming a substantially spherical antenna pattern.

More specifically, the transmitter power divider 20 is a three-ended device which equally divides the signal power applied to its input end to produce therefrom two identical signals of equal power at its remaining two output ends. In the present instance the input end of the divider 20 is connected to the power amplifier 15 of the transmitter 10 and the two output ends are connected to the T-R switches 21. Several power divider devices that may be used in the embodiment of the present invention are shown and described on pages 516 through 528 of Volume 9 of the aforementioned MIT Radiation Laboratory Series, entitled "Microwave Transmission Circuits," by George L. Ragan, published in 1948 by the McGraw-Hill Book Company, Inc.

The T-R switches 21 are also connected to the receiver 11 and to the direction couplers 22a and 22b, the T-R switches serving to alternately connect the transmitter 10 and the receiver 11 to the direction couplers and, therefore, ultimately to the various antennas 23a, 23b, 24a and 24b. More information on this matter will be presented later when the operation of the present invention is described. A number of T-R switches that may be employed in the embodiment of the present invention are illustrated and described on pages 226 through 375 of volume 14 of the MIT Radiation Laboratory Series referred to entitled "Microwave Duplexers" by Louis N. Ridenour published in 1948 by the McGraw-Hill Book Company, Inc.

The directional couplers 22a and 22b are devices that are, broadly speaking, similar to the transmitter power divider 20 in that each coupler is also a three-ended device and also provides a division in some prescribed ratio of the power applied to its input end. As shown in FIGURE 1, the input ends of the directional couplers 22a and 22b are connected to the T-R switches 21 whereas the two output ends of one coupler 22a are respectively coupled to the right and downwardly directed antennas 23a and 24a and the two output ends of the other coupler 22b are respectively coupled to the left and upwardly directed antennas 23b and 24b. While the right and downwardly directed antennas are here coupled together it will be understood that, instead, the right and upwardly directed antennas may instead be coupled together (with the left and downwardly directed antennas coupled together). Since, according to the invention, the forwardly directed antennas 23a and 23b are required to send and receive intelligible signals over a distance appreciably greater than that of the hemispherically directed antennas 24a and 24b, the directional couplers 22a and 22b are constructed to couple appreciably more energy between the T-R switches 21 and the forwardly directed antennas 23a and 23b than between the T-R switches and the hemispherically directed antennas 24a and 24b. Alternatively, attenuators (not shown) may be inserted between the directional couplers 22a and 22b and the hemispherical antennas 24a and 24b in order to assure that the hemispherical antennas have a lesser range than the forwardly directed ones. Directional couplers that may be adapted for use in the embodiment of the present invention are shown and described in detail on pages 854 through 897 of volume 11 of the MIT Radiation Laboratory Series, entitled "Technique of Microwave Measurements," by Carol G. Montgomery, published in 1947 by the McGraw-Hill Book Company, Inc.

Considering the antennas still further, the forwardly directed antennas 23a and 23b are preferably broadside arrays of dipoles and are also preferably oriented with respect to each other so as to form a 90 degree angle therebetween, as indicated by dashed line 25 and 26. Dashed line 27 is a center line and divides the angle formed by the antenas 23a and 23b into two smaller equal angles, each smaller angle therefore being substantially 45 degrees. Immediately behind the antennas 23a and 23b, and insulated therefrom, are a pair of reflectors 28 and 30, respectively, the reflectors being oriented in the same manner as the antennas, as shown in the diagram, and spaced approximately one-quarter wave length therefrom to produce unidirectional field patterns.

Moreover, because of the presence of the reflecting shields 28 and 30, for all practical purposes only signals reflected from a target positioned within the 90 degree frontal angle formed by lines 25 and 26 will be received by both forwardly directed antennas 23a and 23b. Stated in a different way, signals reflected from a target lying in the angle between the right antenna 23a and line 25 will be reflected by the shield 28 and, therefore, for all practical purposes, the reflected signal wavefront will never reach the left antenna 23b. Likewise, for targets in the area bounded by the left antenna 23b and line 26, wavefronts of signals reflected from these targets will never reach the right antenna 23a.

With respect to the hemispherical antennas 24a and 24b, these antennas are used to obtain hemispherical coverage above and below the aircraft and although truly hemispherical radiation patterns are not obtainable in practice, they can be approximated by making the antennas 24a and 24b flush-mounted and cavity-backed circumferential slots located appropriately in the fuselage of the aircraft bearing them. While the hemispherical antennas have been described as being oriented upwardly and downwardly of the protected aircraft it will be appreciated that these antennas may instead may be oriented to cover hemispherical regions to the right and left of the protected aircraft. In such a case the right hemispherical antenna is preferably coupled to the right forwardly directed antenna.

The receiver 11 comprises a far-range guard channel 31 for indicating both the presence of a dangerous terrain obstacle far ahead of the aircraft and the direction in which the craft should be turned to avoid the danger; a near-range guard channel 32 for indicating the presence of a dangerous object within the proximity of the aircraft and the directional maneuver required to avoid the object; a collision channel 33 for detecting the presence of a high speed collision threat, such as another aircraft, which may be on a collision course with the protected craft, and indicating the evasive maneuver required to avoid the threat; and a receiver input network 34 interposed between the antenna network 12 and the far range, near range, and collision channels. The receiver input network 34 receives the echo or return signals intercepted by the antennas 23a, 23b, 24a, and 24b and, after converting these signals into a more suitable form, passes them on to the aforementioned far range, near range, and collision channels. The receiver 11 also includes a receiver timing and processing apparatus 35 and annunciators 36, the processing apparatus 35 containing circuitry for analyzing the received signals and for providing timing signals or gating pulses to the various aforementioned channels to obtain their effective operation, and the annunciators 36 including the various devices which optically, aurally, and/or by tactile sense provide information as to the directional maneuver required for effecting the required evasive action.

The receiver input network 34 comprises a pair of mixer circuits 37 and 38, each mixer circuit having first and second input terminals. The first input terminals of each of the mixers 37 and 38 are connected to the T-R switches 21 whereas the second input terminals of these mixers are respectively connected to the two output ends of a receiver power divider 39 whose input end is connected to receive the 2880 megacycle signal produced by the frequency multipliers 14 of the transmitter 10. The receiver power divider 39 is customarily included in the antenna network 12 and may be substantially the same as the transmitter power divider 20 in that it applies two 2880 megacycle signals of equal power to the mixer circuits 37 and 38. The mixer circuits 37 and 38 are respectively connected at their output ends to a pair of intermediate frequency pre-amplifiers 40 and 41 which, in turn, are connected to a conventional adder circuit 42. An intermediate frequency amplifier 43, constituting the output circuit for the receiver input network 34 is connected to the adder circuit 42.

The far range guard channel 31 comprises a pair of far range gate circuits 45 and 46 respectively connected to pre-amplifiers 40 and 41 of the receiver input network 34, the output ends of the two range gate circuits being connected to the two input terminals of both a phase detector circuit 47 and a coincidence circuit 49. A direction sensor device 50 is connected between the phase detector and coincidence circuit, 47 and 49 respectively, and the annunciators 36, the connection to the annunciators being made by means of a line 51. Considering the elements of the far range guard channel 31 in greater detail, a range gate circuit of the kind used herein may be defined as one that will only pass signals returned from a target located between predetermined upper and lower range or distance limits from the aircraft. For this purpose, each range gate circuit comprises an ordinary gating circuit, many of which are well known in the art. The gating circuits are normally in an inoperative condition and hence will not normally pass signals applied to them. However, in response to a voltage pulse periodically applied to the range gate circuits 45 and 46, by a common pulse source (not shown) in the receiver timing and processing apparatus 35, both gating circuits are rendered operable to pass signals which may be applied to them for the duration of the pulse. The voltage pulse applied to the range gate circuits 45 and 46 is applied through a line 48 interconnecting these gate circuits and the pulse source in the timing and processing apparatus 35.

By way of example, the interval of time between the leading edges of successive pulses applied to the far range gate circuits 45 and 46 preferably corresponds to a lower target range limit of 10,000 feet and the interval of time between the leading edge of a pulse and the lagging edge of the pulse preferably corresponds to an upper target range limit of 12,500 feet. These distances correspond to, respectively, time periods of about 20 and about 25 microseconds after the transmission of a pulse by the antenna system 12. Thus, signals will be applied to the phase detector 47 and coincidence circuit 49 only when returned from obstacles at a distance range of from 10,000 to 12,500 feet from the protected aircraft.

With respect to the phase detector 47, this is the type of circuit that produces an output voltage whose polarity is indicative of the phase angle between the two signals applied thereto, a number of such circuits being available. A number of phase detector circuits that may be adapted for use in the far range guard channel 31 of the present invention are shown and described in pages 511 to 524 of volume 9 of the MIT Radiation Laboratory Series, entitled "Waveforms," published in 1949 by the McGraw-Hill Book Company, Inc., New York.

As for coincidence circuit 49, this type of circuit may be generally defined as one which will produce an output signal only when signals applied to its two input terminals coincide in time. Any one of a number of such circuits well known in the art may be adapted to use herein, for example, that shown on page 407 of the book entitled "Active Networks" by V. C. Rideout, published in 1954 by Prentice-Hall, Inc., New York.

Finally, the sensor device 50 may be a flip-flop circuit, a relay, or any other device that can be used to appropriately activate the visual, aural, and/or tactile direction indicating elements of the annunciators 36 in response to signals produced by the phase detector 47 and/or the coincidence circuit 49.

The near range guard channel 32 comprises a video detector circuit 52 connected to an intermediate frequency amplifier 43 in the receiver input network 34, the output end of the video detector circuit 52 being connected to the first of two input terminals of a near range gate circuit 53 which circuit is basically the same as either of the far range gate circuits 45 and 46 of the far range guard channel 31. The second input terminal to the near range gate circuit 53 is connected to the receiver timing and processing apparatus 35 which periodically activates the near range gate circuit 53 by means of a voltage pulse, thereby enabling the gate circuit to pass any signals that may be applied thereto during the pulse period.

In the case of the near range gate circuit 53, the timing pulses applied to it from the receiver timing and processing apparatus 35 are synchronized to coincide with the pulsed carrier signals radiated into space and, furthermore, are of such duration as corresponds to a target range of approximately 0 to 500 feet from the aircraft. In other words, since, relatively speaking, so little time elapses between the transmission of a signal by the transmitter 10 and the reception of that signal by the receiver 11 after the signal has been reflected from a target in the near range guard zone, it is therefore preferable and practical to activate the near range gate circuit 53 at the time a signal is transmitted and maintain it operable for about one microsecond, the longest interval of time in which reflected signals may be received from targets in the near range zone. Thus, in a manner similar to the one mentioned above in connection with the far range gate circuits 45 and 46, the leading edge of a pulse applied to the near range gate circuit 53 coincides with the leading edge of the radiated pulsed carrier signal and is of sufficient width to permit signals reflected from a target at the outermost border of the near range zone, which border has been taken as being 500 feet, to pass through the near range gate circuit 53.

The direction of a detected object within the near range guard ring, relative to the protected aircraft, is determined by producing a biasing signal in response to the detection of an object in this guard ring, the biasing signal thereafter being used to cut out from the receiver 11 one of the two hemispherically directed antennas 24a or 24b. If after the cut-out signals continue to be passed to the near range guard channel 32, the signals must therefore be coming from an object in the direction covered by the antenna that was not cut out. Conversely, if no signals are thereafter passed to the guard channel 32, the received signals must necessarily be originating in the direction guarded by the antenna whose intercepted signals have been cut out.

In particular, the near range gate circuit 53 is connected to a near range direction sensor 54. This direction sensor 54 has a pair of outputs, the first output being connected via a line 55 to a second input terminal of the intermediate freqency pre-amplifier 41 of the receiver input network 34, and the second output being connected via a line 56 to the annunciators 36. The direction sensor 54 produces a cut off signal, in response to the receipt of a signal from the near range gate 53, for momentarily cutting off one intermediate frequency pre-amplifier, such as the pre-amplifier 41 connected to process information from the upwardly directed hemispherical antenna 24b. If signals continue to be received by the video detector 52 of the near range guard channel 32 the determination is made that the detected object is coming from a direction being processed by the other intermediate frequency pre-amplifier 40. This means that the detected object is being detected by the downwardly directed hemispherical antenna 24a.

The collision channel 33 comprises a Doppler detector, or more accurately a Doppler phase detector circuit 57 having two input terminals, the first input terminal being connected to the output end of the intermediate frequency amplifier 43 of the receiver input network 34 and the second input terminal being connected via a line 58 to the second output terminal of the crystal oscillator 13 in the transmitter 10. The Doppler detector 57 functions basically as a mixer. The signal from the Doppler detector 57 is a bi-polar pulse train which is amplitude modulated at the Doppler shift frequency. An amplifier 60 is connected between the Doppler detector 57 and a cathode follower circuit 61, the output end of the cathode follower circuit being connected to the receiver timing and the processing apparatus 35.

Although the receiver timing and processing apparatus 35 is not considered a part of the present invention, it has nevertheless been included in FIGURE 1, together with the annunciators 36, in order to enhance the understanding of the invention. Briefly, therefore, with respect to the timing and processing apparatus 35, this apparatus processes the signals out of the cathode follower circuit 61 in the collision channel 33, these signals being the above-mentioned pulse trains amplitude modulated at the Doppler frequencies. These pulse train signals are separated in the timing and processing apparatus 35 in accordance with the closing velocities and distances of the threatening aircraft from the protected aircraft. The rate of change of closing velocity is then determined. If the distance and closing velocity of the collision threat, relative to the protected aircraft, falls within given ranges of distance and associated closing velocities which together would cause the collision threat to arrive at the location of the protected aircraft within a predetermined warning time interval after its signal arrives (say 15 seconds), and if there is also substantially no change in closing velocity (indicating that the relative velocity between the collision threat and the protected aircraft is in a direction along a line connecting the two), an indication of the danger involved is provided in annunciators 36, thereby providing information required to avoid the threat. The receiver timing and processing apparatus 35 also includes direction sensing apparatus for determining the direction of approach of the collision threat and, hence, the direction required for evasive action. This direction sensing apparatus may be either of the types described before and, therefore, will not be further elaborated upon. As indicated before, the processing apparatus 35 also includes the necessary pulsing and timing circuits that produce the pulses that render the far range gate circuits 45 and 46 and the near range gate circuit 53 operable at the proper times. Since the far and near range guard channels and the collision channel employ separate handling circuits, namely the circuits within dashed line boxes 31, 32, and 33, the system of the invention is capable of processing information relating to contemporaneous collision threats.

*Operation of the System*

Considering now the operation of the system of the invention, in the transmitter 10 the crystal oscillator 13, in a well-known manner, continuously generates a signal at a basic reference frequency of 60 megacycles. This oscillator signal is applied to the frequency multipliers 14 wherein the frequency of the oscillator signal is successively doubled and tripled by the doubler and tripler stages therein until a first signal is produced at a frequency of 2880 megacycles, the frequency of the first signal therefore being forty-eight times greater than the oscillator signal frequency. In the multipliers 14, the 2880 megacycle signal is also heterodyned against the 60 megacycle oscillator signal by means of the mixer (not shown) included therein to produce a second signal at a frequency of 2940 megacycles, which is the frequency of the carrier signals to be radiated into space. This second signal, which is a continuous-wave signal, is applied to the power amplifier 15.

Referring now to the pulse repetition rate oscillator cricuit 17, this circuit first generates a 40 kilocycle signal which is converted into a square-wave signal having a 40 kilocycle pulse repetition rate, the 40 kilocycle signal frequency, and therefore the pulse repetition rate of the above-mentioned square wave signal, being varied slightly by the jitter modulator 18 in the manner previously explained. The 40 kilocycle square wave train out of the oscillator circuit 17 is applied to the pulse modulator 16 which produces therefrom a unidirectional pulse train having the same 40 kilocycle pulse repetition rate. This last pulse train is also applied to the power amplifier 15 which, in response to each pulse of the pulse train, passes the second 2940 megacycle signal out of the multipliers 14 and into the transmitter power divider 20. Consequently, the power amplifier 15 applies a train of pulsed carrier signals to the transmitter power divider 20, the pulse repetition rate and carrier frequency of the pulsed carrier signals being approximately 40 kilocycles and 2940 megacycles, respectively.

The transmitter power divider 20 divides the pulsed carrier signals applied thereto into two such signals of equal power, each pair of signals then being applied to the T-R switches 21. During the transmitting period the T-R switches 21 are operable to electrically connect the two output ends of the divider 20 to the respective input ends of the directional couplers 22a and 22b, with the result that each associated pair of pulsed carrier signals is applied to the directional couplers. In other words, during the transmitting period two identical trains of pulsed carrier signals are respectively applied to the directional couplers 22a and 22b.

In accordance with the invention, a major portion of the energy content of the two pulsed carrier trains, derived from the single transmitter 10, is passed on by the directional couplers 22a and 22b to the forwardly directed antennas 23a and 23b, respectively, whereat the signals are radiated into space in front of the protected aircraft. The smaller or remaining portion of the energy content of the two pulsed carrier trains applied to directional couplers 22a and 22b is passed on by these couplers to the hemispherical antennas 24a and 24b whereat the signals are also radiated into space. In the latter case the radiation is propagated substantially equally in all directions above and below the aircraft so that, for all practical purposes, spherical or omnidirectional coverage is obtained about the aircraft.

Before continuing the explanation of the operation of the system reference will be made to FIGURES 2 to 5 wherein there is depicted the individual and combined field patterns of the antennas 23a, 23b, 24a, and 24b, as well as the regions of space sought to be covered for protective purposes by the electromagnetic fields radiated into space by these antennas.

As indicated before, the present invention provides means establishing at least two distinct types of sensing regions for providing information relative to the presence of objects in the regions. The first of the sensing regions extends for an appreciable distance outwardly from the protected aircraft along lines generally concurrent with its path of travel, or generally forwardly of the aircraft, while the second of the regions extends for a short distance in a generally spherical pattern around the vehicle, with the first and second sensing regions being established by separate antenna systems energized by a single signal source.

Figure 2:
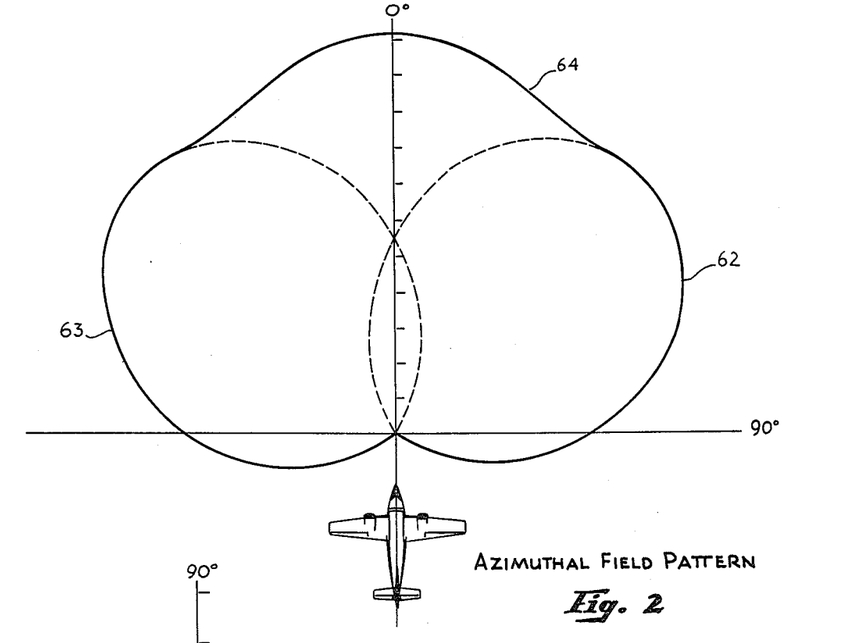
FIGURES 2 and 3 are graphical representations of field patterns taken in, respectively, azimuthal and elevation planes, and obtained from the antenna elements depicted in the embodiment of FIGURE 1.
Figure 3:
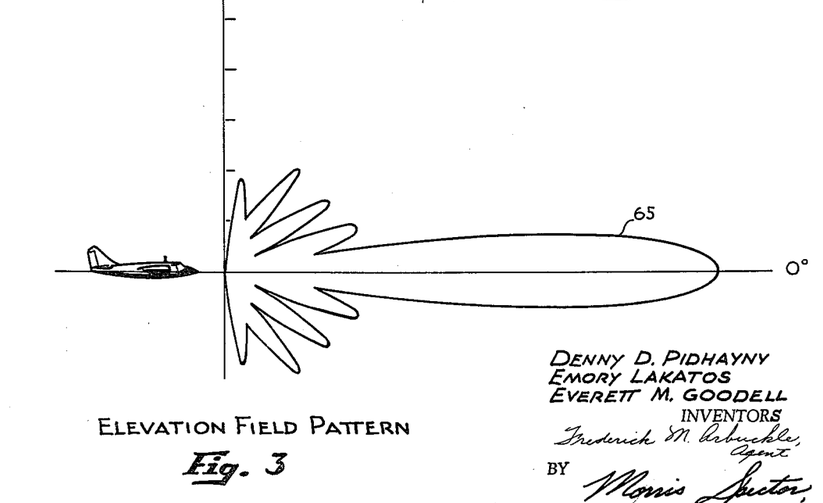

As to the forwardly directed radiation pattern: Referring to FIGURE 2, there are illustrated therein elliptically shaped curves 62 and 63 which represent the individual field patterns for the forwardly directed antennas 23a and 23b, respectively, taken in an azimuthal plane, the patterns being typical of those obtained from an antenna backed by a reflector, such as the antenna 23a and reflector 28 (FIGURE 1). The combined field pattern for the antennas 23a and 23b, obtained by adding the individual field patterns, is generally designated 64 and, as shown in FIGURE 2, generally resembles a semicircle. The elevation field pattern contour of the forwardly directed antennas is shown in FIGURE 3 and is generally designated 65. The elevation field pattern is generally cigar shaped, that is, of narrow beam width, and includes a plurality of side lobes which are useful in providing additional vertical coverage not obtained from the main lobe 65 which, it will be obvious to those skilled in the art, will only provide protective coverage for a predetermined number of vertical degrees.

Figure 4:
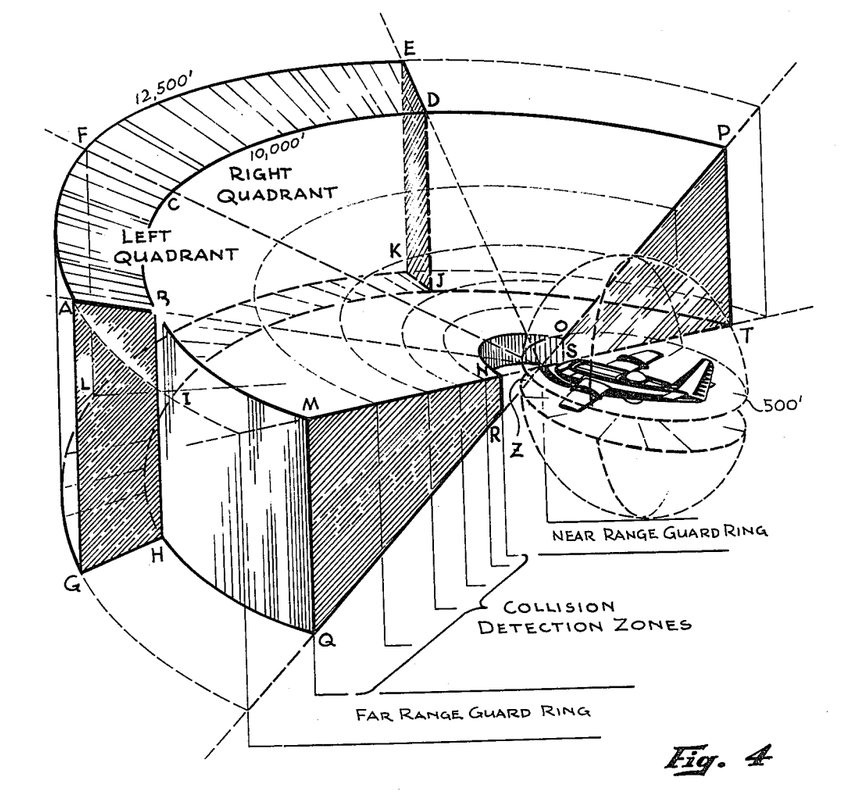
FIGURE 4 is a representation in perspective of the different zones of protection carved out of the electromagnetic fields radiated in accordance with the antenna field patterns of FIGURES 2 and 3.

It will also be obvious to one skilled in the antenna and wave propagation arts that from field patterns 64 and 65 one may carve out forwardly directed zones of coverage of the type generally shown in FIGURE 4 and designated therein by letters A through T and Z. In other words, the horizontal and vertical electromagnetic coverage is such that portions of space therein may be zoned in accordance with the present invention to provide protection against different types of collision threats.

As illustrated in FIGURE 4, the volume of space indicated by letters A to L is reserved for protection against large terrain obstacles, such as mountains, which may appear in this zone, zone A to L being associated with the far range guard channel 31 referred to in connection with FIGURE 1. Similarly, the volume of space indicated by letter M, N, O, P, D, C, B, and Q, R, S, T, J, I, H, is reserved as a region of protection against rapidly moving collision threats, such as other aircraft that may be moving at relatively high speeds through this region on a collision course with the protected aircraft. Accordingly, this second sensing region is associated with the collision channel 33 in FIGURE 1.

The third forward sensing region corresponds to the small volume of space immediately in front of the protected aircraft and is designated simply by the letter Z for purposes of clarity. Zone Z is reserved to protect the aircraft against relatively slow moving objects, such as another aircraft which is slowly being overtaken by the protected aircraft, and, therefore, is associated with near range guard channel 32 (FIGURE 1). As may be seen from both FIGURES 4 and 5, the near range zone Z and the intermediate sensing region M to T extend in substantially 180 degree arcs, while the far range region A to L extends only in a 90 degree frontal arc. Furthermore, the far range region A to L is equally divided into left and right quadrants, the purpose of which will be more fully understood from the later description of the operation. It should also be noted from FIGURE 4 that the various range limits for the three forwardly directed regions are also indicated, the boundary limits being at 500, 10,000 and 12,500 feet as previously mentioned.

Figure 5:
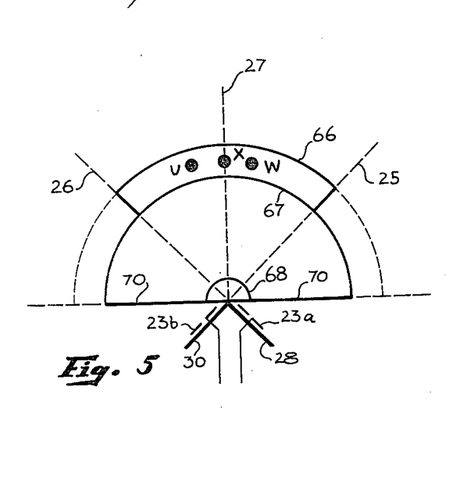
FIGURE 5 is a top view of the zonal representation of FIGURE 4.

Referring now to FIGURE 5, there is shown therein a top or plan view of the various regions discussed above in connection with FIGURE 4. In this top view dashed lines 25, 26, and 27 designate the same boundaries as the similarly numbered lines in FIGURE 1; the region defined by these lines, and arcs 66 and 67, corersponds to the region designated A to L in FIGURE 4, the region defined by arcs 67 and 68 and line 70 corresponds to the region designated M to T in FIGURE 4, and the region bounded by arc 68 and line 70 corresponds to zone Z in FIGURE 4. In describing the operation in detail, the various regions of FIGURE 5 will be referred to, except that wherever it is deemed necessary for purposes of clarity, the corresponding regions of FIGURE 4 will also be referred to.

Considering now the operation still further, the protection obtained from the far range region defined by lines 25 and 26 and arcs 66 and 67 is FIGURE 5 (region A to L in FIGURE 4) will be explained first. In this respect it will be assumed that a terrain obstacle, such as a mountain, is encountered in the volume of space defined by line 26 and 27 of the far range region, which corresponds to the left quadrant of the far range region of FIGURE 4. For purposes of explanation, such an obstacle will be represented by a point designated U. Since the obstacle U is located in the region bounded by lines 26 and 27, the wavefront of the signal reflected from the obstacle is received at both forwardly directed antennas 23a and 23b, the wavefront arriving at the left antenna 23b a very short time before it arrives at the right antenna 23a. As a result, a signal is induced in the left antenna 23b before a similar signal is induced in the right antenna 23a. However, the time interval between the reception of these two signals by the antennas is very small so that they overlap in time for substantially their entire duration. A phase difference will, however, have been introduced between the two signals.

The signals generated in the antennas 23a and 23b are respectively applied to the direction couplers 22a and 22b (FIGURE 1) which pass these signals to the T-H switches 21. During this period of reception the T-R switches 21 are operable to connect the direction couplers 22a and 22b, and therefore the antennas 23a and 23b, to the receiver 11 and in particular to the receiver input network 34. Consequently, the signals are passed through the T-R switches and into the mixer circuits 37 and 38 which respectively heterodyne these signals against the 2880 megacycle signal applied thereto from the frequency multipliers 14 via the receiver power divider 39. As a result, the mixer circuits 37 and 38 produce output signals at an intermediate frequency which is either the sum or the difference of the signal frequencies applied to the mixer circuits by the antennas and the frequency multipliers, the frequency of these output signals preferably being the latter, that is, the difference frequency. The signals produced by the mixer circuits 37 and 38 are respectively applied to the intermediate frequency amplifiers 40 and 41, the difference in phase between the two original signals being maintained at the amplifiers due to the use of a common heterodyning signal. The intermediate frequency amplifiers 40 and 44 amplify the signals and thereafter apply them to the far range gate circuits 45 and 46 which, in response to range gate pulses applied to them by the receiver timing and processing apparatus 35, pass the amplified signals from the intermediate frequency amplifiers 40 and 41 to both the phase detector circuit 47 and the coincidence circuit 49, the signal from the right far range gate 45 being applied to the first input terminals of the detector and coincidence circuits and the signal from the left range gate 46 being applied to the second input terminals of these circuits.

In response to the two signals simultaneously applied thereto, the coincidence circuit 49 applies an activating signal to the direction sensor device 50 which renders it operable, thereby arbitrarily producing a momentarily directional indication in the annunciators 36. Simultaneously with the triggering of the sensor device 50 by the coincidence circuit 49, another signal is applied to the sensor device by the phase detector 47 which signal will either cause the first directional indicator to remain on or will cause it to be turned off and another turned on to provide the desired directional information. This last operation just described occurs almost instantaneously, certainly too fast for the eye to follow, so that no confusion is caused at any time. For all practical purposes, it may be said that only one directional indication has been provided.

More specifically, the signal out of the right range gate 45 and applied to the first input terminal of the phase detector circuit 47 is used therein as a reference signal, the phase detector circuit producing an output voltage whose polarity is related to the phase angle between the signal out of the left range gate 46 and the aforementioned reference signal. In other words, a positive voltage developed by the detector circuit 47 may be used to indicate that the signal induced in the left antenna 23b leads the signal induced in the right antenna 23a, which would correspond to a situation where the obstacle is located between lines 26 and 27, as shown by the obstacle designated U. This positive voltage activates the direction sensor device 50 in such a manner that the proper signal is turned on in annunciators 36, thereby providing the directional information needed for avoiding the obstacle U.

The output voltage from phase detector 47 is negative rather than positive when the signal intercepted by the left antenna 23b lags rather than leads the signal intercepted by the right antenna 23a. Where such a signal lag occurs it merely means that the obstacle to be avoided is in the region defined by lines 25 and 27 and arcs 66 and 67 in FIGURE 5 (the right quadrant in FIGURE 4), this obstacle being designated by point W in FIGURE 5. Thus, where a negative voltage signal is applied to the direction sensor 50, the signal provided by the annunciators 36 will advise that an opposite evasive maneuver is required.

The voltage developed at the output of the phase detector circuit 47 is zero when the obstacle is "dead ahead," that is to say, somewhere on line 27 in the far range region or guard ring, as illustrated by point X. In such an event, it makes no difference which way the aircraft is turned so that the directional signal arbitrarily provided by annunciators 36 in response to the signal produced by coincidence circuit 49 will remain on, thereby advising either a right or left turn, which is sufficient under these circumstances.

When an obstacle is located outside the region bounded by lines 25 and 27 and arcs 66 and 67, that is, outside the region of space bounded by letters A to L in FIGURE 4, the returning signals are received in only one antenna due to the shielding effect of the reflectors 28 and 30. Under this condition, only one signal will be received by either the phase detector 47 or the coincidence circuit 49 so that no warning will be given by the annunciators 36. This is precisely what is desired, for any obstacle far to one side can and should be ignored.

It should be noted here that the chances of a false alarm due to noise may be substantially reduced by including a threshold circuit in each of far range gates 45 and 46 for normally biasing these gates beyond cut-off to an extent such that only signals of a large magnitude can pass through the gates; this takes advantage of the fact that a mountain or other large obstacle inherently returns a large magnitude signal.

The protection obtained from the intermediate region or collision detection zones, bounded by arcs 67 and 68 and line 70 in FIGURE 5 (the region bounded by points M, N, O, P, D, C, B and points Q, R, S, T, J, I, H in FIGURE 4), will now be considered. If an aircraft is in this region and is on a collision course with the craft bearing the system the signal reflected from the threatening aircraft is received at one or both of forwardly directed antennas 23a and 23b depending upon the particular location of the aircraft in the intermediate region; if the threatening aircraft is located between lines 25 and 26 both antennas will intercept the reflected signal and if otherwise the signal will be intercepted by only one of the two antennas. It is unimportant for purposes of collision detection whether one or both antennas receive the signal.

The one or more intercepted signals are, in the manner previously explained, passed through the directional couplers 22a and 22b and the T-R switches 21 to the receiver input network 34 wherein they are converted into one or more intermediate frequency signals by the mixers 37 and 38. The intermediate frequency signal or signals are then amplified by the intermediate frequency preamplifiers 40 and 41 and thereafter passed to the adder circuit 42. If there are two intermediate frequency signals out of the pre-amplifiers 40 and 41, then they are additively combined in the adder 42 and applied as a single intermediate frequency signal to the intermediate frequency amplifier 43 which further amplifies the single intermediate frequency signal.

The signal produced by the intermediate frequency amplifier 43 is thereafter applied to the intermediate region processing channel or collision channel 33, and in particular to the Doppler detector circuit 57 of the collision channel. The Doppler detector circuit 57 beats or heterodyne the intermediate frequency signal against the 60 megacycle signal applied to the detector circuit 57 by the crystal oscillator 13 in the transmitter 10, with the result that the detector circuit produces a bi-polar pulse train which is amplitude modulated at the Doppler frequency. This pulse train is applied by the detector circuit 57 to and through the amplifier 69 to the cathode follower circuit 61. This same pulse train is applied by the cathode follower circuit 61 to the receiver timing and processing apparatus 35 wherein the distance and velocity of the threatening craft is determined. The distance of the theatening craft is determined by range gating circuitry (not shown); the velocity of the threatening craft is determined by applying the received signal to a number of narrow band-pass or Doppler filters (not shown) that pass only signals falling within predetermined frequency ranges (corresponding to predetermined velocity ranges), a separate band-pass filter being used for each velocity range to be handled. The intermediate sensing region is divided into a number of distance ranges, indicated in FIGURE 4 by the legend "Collision Detection Zones," each associated with a different closing velocity. Each distance range has a velocity range associated with it. For example, a distance range of from 1,750 feet to 2,500 feet may have a closing velocity range of from 150 to 250 feet per second, while a distance range of from 2,500 feet to 3,500 feet may have a closing velocity range of from 250 feet to 350 feet per second. Each of the distance and velocity range associations are such that if a craft within any of the distance ranges or zones has a closing velocity relative to the protected aircraft which would cause the threatening craft to arrive at the location of the protected aircraft within a predetermined warning time interval after its signal arrives, the signal is processed by the processing apparatus 35 as a potential collision threat.

However, an indication of the presence of a collision threat is preferably not given until the received signal is further analyzed to more accurately predict the course of the potential collision threat. The further analysis contributes to substantially reduce false collision indication alarms. The pulse train received from the Doppler detector circuit 57 through the cathode follower circuit 61, is preferably observed for a short period of time, say 3 seconds, to determine whether there is a change in the detected Doppler frequency. A substantial change in the Doppler frequency over the short period of time indicates that the threatening aircraft and the protected aircraft are not in fact on a collision course since the relative velocity between the two is not in a direction on a line connecting the two craft. In other words, while the two craft are bearing generally toward each other, the change in detected Doppler frequency indicates that they will actually clear each other by a safe distance. On the other hand, little or no change in detected Doppler frequency indicates that the two craft are bearing toward each other substantially on a line connecting the two, and that therefore the two craft are on a collision course. In consequence of such a determination, the receiver timing and processing apparatus 35 applies a signal to the annunciators 36 for actuating the appropriate indicator therein. Information as to the direction of approach of the danger, which may be determined by one of the direction determining arrangements described, is used to select a desired direction indication annunciator to provide the necessary directional information for avoiding the danger.

Since a circuit for measuring change in velocity is essentially a change in frequency detector, such a circuit will not be considered in detail. However, the change in closing velocity detector may comprise an integrating circuit (not shown) preceded by direct current blocker such as a capacitor. The velocity information (the velocity being represented by the frequency of the information signal) is fed to a discriminator circuit (not shown) to convert the velocity information to a direct current signal level. The direct current signal is then passed through the direct current blocker referred to and into the integrator. At the end of a given time interval, say 3 seconds, the voltage level of the integrating circuit is examined, as by switching the integrator output through a threshold circuit to determine if the voltage in the integrator has been built up to a value greater than that of a predetermined value of biasing voltage. If there was substantially no change in closing velocity the direct current output from the discriminator circuit would be substantially at a constant value and, hence, no appreciable current would pass into the integrator. The threshold circuit would consequently sense this lack of voltage build-up at the end of the given time interval and allow an alarm signal from the receiver timing and processing apparatus 35 to pass to the annunciators 36, thus indicating that the collision threat and protected aircraft will arrive at substantially the same place at the same time. On the other hand, if there is an appreciable rate of change in the detected closing velocity, the direct current output from the discriminator will change. This change in direct current output will cause current to pass through the direct current blocker and into the integrator causing a voltage to build up therein. A sensing, by the threshold circuit, of a voltage build-up more than a predetermined minimum indicates that the two aircraft are not in fact on a collision course, but rather that they will miss each other by a safe distance. Under these circumstances the threshold circuit would prevent the passage of an alarm signal from the processing apparatus 35 to the annunciators 36.

As to the omnidirectional radiation pattern: Consider now the near range guard ring. This sensing region is realized by the substantially spherical sensing pattern produced by the two hemispherical antennas 24a and 24b and by the small portion of the forwardly directed sensing region, designated Z in the drawings, produced by the two forwardly directed antennas 23a and 23b. Assume for purposes of explanation that another aircraft is rising and slowly overtaking the protected aircraft. When this other aircraft comes within range of the downwardly directed hemispherical antenna 24a an intermediate frequency signal, representative of the sensed aircraft, is produced by the intermediate frequency amplifier 43 of the receiver input network 34 and is applied to the near range guard channel 32, and in particular, to the video detector circuit of this channel. The video detector circuit 52 demodulates the intermediate frequency signal with the result that a pulse is applied to the near range gate circuit 53. If the detected aircraft is within the range covered by the range gate circuit 53, the gate is operable to pass the pulse to the direction sensor 54. This last-named direction sensor 54, in response to the pulse applied to it, applies a signal through line 55 to one of the intermediate frequency pre-amplifiers 41 thereby biasing this pre-amplifier to cut-off. Since a signal will continue to be received by the video detector circuit 52 after cut-off of the intermediate frequency pre-amplifier 41, the direction sensor 54 actuates the annunciator 36 indicative of the evasive action required to avoid a collision threat approaching from below. Conversely, if the detected aircraft were approaching from above, the signal received by the video detector circuit 52 will cease when the pre-amplifier 41 is cut-off, and an opposite annunciator indication would be given. Any ambiguity which may result when the target aircraft is within zone Z, the near-range portion of the forwardly directed antennas 23a and 23b, which ambiguity is due to the fact that in such an event both the forwardly directed and omnidirectional antennas would be receiving simultaneously, is deemed unimportant for the reason that the detected object can be easily avoided by turning either to the left or to the right and, hence, it is immaterial which direction is indicated by the annunciators 36.

While the near range guard ring has been described as having a single set of hemispherical antennas 24a and 24b to provide general directional information, it is to be understood that more detailed directional information may be provided with respect to objects detected in the near range guard ring. Such more detailed information can be provided, for example, by providing an additional set of two hemispherically directed antennas (not shown) each oriented to receive reflected signals in directions overlapping half of the region sensed by each of the original hemispherical antennas. Thus, if each of the original set of two antennas cover, respectively, directions upwardly and downwardly of the protected aircraft, then each of the additional set of two antennas are oriented to cover, respectively, directions to the right and left of the aircraft. Then, depending on which two antennas detect an object in the near range guard ring, information will be provided as to whether the object is right and down, left and down, right and up, or left and up of the protected aircraft. The additional processing circuitry required for the additional pair of antennas may comprise a receiver input network and near range guard channel similar to, but separate from, respectively, the receiver input network 34 and near range guard channel 32 used for the original set of hemispherical antennas.

From the foregoing it is seen that the improved guidance system of the invention provides information as to the presence of dangerous objects bearing various directional and distance relationships to a craft, and provides collision avoidance information regarding these objects.

What is claimed is:

1. Return echo signal type detecting apparatus for a craft, comprising: means for establishing at least two distinct sensing regions each defined by a different radiation pattern, one of said sensing regions being a high energy region extending outwardly from said craft along a line generally concurrent with a path of travel of said craft and having a relatively high degree of sensing sensitivity and the other of said sensing regions being a low energy region extending along lines generally transverse to said path of travel and having a relatively low degree of sensing sensitivity appreciably less than that of said one sensing region; a single source of radiation energy for producing said different radiation patterns; said sensing region establishing means comprising separate antennas for each of said sensing regions; the radiation pattern producing means establishing the sensing region generally concurrent with said path of travel being connected to said radiation source with relatively high energy transfer means, and the radiation pattern producing means establishing the other sensing region being connected to said radiation source through relatively low energy transfer means thereby to establish a generally transverse sensing region having an appreciably lesser range than that of said one sensing region, and timed gating means connected to establish a distance range of response associated with said one sensing region that is substantially greater than, and substantially free of distance range overlap with, the distance range response associated with said other sensing region.

2. The apparatus claimed in claim 1, wherein said radiation pattern producing means of said one sensing region is constructed to produce a pair of overlapping sensing sub-regions each oriented to be responsive only in a relatively small angular extent in a different direction forwardly of said craft; and said radiation pattern producing means of said other sensing region is constructed to produce a pair of substantially hemispherical sensing sub-regions, each substantially free of overlap with the hemispherical sensing sub-region of the other, and together forming a substantially omnidirectional sensing pattern.

3. The apparatus claimed in claim 2, further including separate means associated with each of said radiation pattern producing means for producing information indicative of the sub-region within which a sensed object is positioned.

4. The apparatus claimed in claim 3, wherein said radiation pattern producing means associated with said one sensing region comprises a pair of dipole antenna arrays each oriented in a different direction substantially 45 degrees to one side of said line.

5. The apparatus claimed in claim 3 wherein said radiation pattern producing means associated with said other sensing region comprises a pair of oppositely directed slot-type antennas.

6. Return echo signal type detecting apparatus for a craft, comprising: means for establishing at least two distinct sensing regions each defined by a different radiation pattern, one of said sensing regions being a high energy region extending outwardly from said craft along a line generally concurrent with a path of travel of said craft and having a relatively high degree of sensing sensitivity and the other of said sensing regions being a low energy region extending along lines generally transverse to said path of travel and having a relatively low degree of sensing sensitivity appreciably less than that of said one sensing region; a single source of radiation energy for producing said different radiation patterns; said source having a high energy output terminal and a low energy output terminal; said sensing region establishing means comprising separate antennas for each of said sensing regions; the radiation pattern producing means establishing the sensing region generally concurrent with said path of travel connected to said high energy output terminal of said radiation source, and the radiation pattern producing means establishing the other sensing region being connected to said low energy output terminal of said radiation source thereby to establish a generally transverse sensing region having an appreciably lesser range than that of said one sensing region; and timed gating means connected to establish a plurality of different distance ranges of response associated with said one sensing region, with each of said distance ranges substantially greater than, and substantially free of distance range overlap with, the distance range response associated with said other sensing region, whereby each of said different distance ranges of response is responsive to echo signals related to objects at a distance greater than the distance to which said other sensing region is responsive.

7. Return echo signal type detecting apparatus for a craft, comprising: radiation transmitting means and radiation receiving means; two separate antenna systems; directional coupling means connecting said transmitting and receiving means to said antenna systems; said coupling means coupling a lesser amount of energy between said transmitting means and one of said antenna systems than between said transmitting means and the other of said antenna systems for limiting the range of said one of said antenna systems to a distance range appreciably less than that of said other of said antenna systems; said antenna systems being constructed and oriented to respond to return echos in substantially different directions; and timed distance range gating means connected to establish a distance range of response such that the response range associated with said one of said antenna systems is substantially less than, and substantially free of overlap with, the response range associated with said other of said antenna systems.

8. The apparatus claimed in claim 7, wherein said one of said antenna systems comprises an array of dipole antennas and said other of said antenna systems comprises an array of oppositely directed, substantially hemispherically responsive antennas.

References Cited in the file of this patent

UNITED STATES PATENTS

| | | |
|---|---|---|
| 2,486,197 | Newbold | Oct. 25, 1949 |
| 2,531,201 | Delange | Nov. 21, 1950 |
| 2,541,009 | Tashjian | Feb. 6, 1951 |
| 2,682,048 | Longacre | June 22, 1954 |
| 2,825,053 | Mittleman et al. | Feb. 25, 1958 |

OTHER REFERENCES

"Heart of Anti-Collision System," by J. Holahan, Aviation Age., December 1956, Vol. 26, No. 6, pp. 80–85.

"Collins 'Radar Cocoon' to protect Aircraft," by P. J. Klass, Aviation Week, Sept. 24, 1956, Vol. 65. No. 9, pp. 37, 38.